United States Patent
Cassoli

(10) Patent No.: US 12,036,736 B2
(45) Date of Patent: Jul. 16, 2024

(54) THREE-DIMENSIONAL PRINTING ASSEMBLY

(71) Applicant: Ford Global Technologies, LLC, Dearborn, MI (US)

(72) Inventor: Matthew Cassoli, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/578,668

(22) Filed: Jan. 19, 2022

(65) Prior Publication Data
US 2023/0226758 A1    Jul. 20, 2023

(51) Int. Cl.
| | |
|---|---|
| B29C 64/188 | (2017.01) |
| B29C 64/124 | (2017.01) |
| B29C 64/141 | (2017.01) |
| B33Y 10/00 | (2015.01) |
| B33Y 30/00 | (2015.01) |

(52) U.S. Cl.
CPC .......... *B29C 64/188* (2017.08); *B29C 64/124* (2017.08); *B29C 64/141* (2017.08); *B33Y 10/00* (2014.12); *B33Y 30/00* (2014.12)

(58) Field of Classification Search
CPC .......... B29C 64/10–153; B29C 64/165; B29C 64/188–194; B29C 70/38–388; B29C 70/72
See application file for complete search history.

(56) References Cited

U.S. PATENT DOCUMENTS

| | | | |
|---|---|---|---|
| 2017/0066197 A1* | 3/2017 | Morikawa | B29C 64/112 |
| 2020/0047404 A1* | 2/2020 | Plott | B29C 64/118 |
| 2020/0079028 A1 | 3/2020 | Miller et al. | |
| 2020/0307107 A1* | 10/2020 | Madinger | B22F 10/40 |
| 2020/0329814 A1 | 10/2020 | Wang et al. | |
| 2021/0008792 A1* | 1/2021 | Wang | B33Y 70/10 |
| 2021/0402480 A1* | 12/2021 | Sweetland | B33Y 30/00 |

FOREIGN PATENT DOCUMENTS

| | | | | |
|---|---|---|---|---|
| WO | WO-2017182668 A1 * | 10/2017 | ........... | B22F 3/1055 |
| WO | 2020144206 | 7/2020 | | |

OTHER PUBLICATIONS

Machine Translation of Hascoet, Espacenet, accessed Sep. 4, 2023 (Year: 2017).*
Bas, Test with preprinted support for PETG models with overhang, Aug. 29, 2020, Printables, https://www.printables.com/model/39647-test-with-preprinted-support-for-petg-models-with—(Year: 2020).*
H., Amelia, New Moving Platform 3D Printer Saves Time and Money, 3D Printing News, Apr. 7, 2021.

* cited by examiner

Primary Examiner — Philip C Tucker
Assistant Examiner — Andrew L Swanson
(74) Attorney, Agent, or Firm — Burris Law, PLLC

(57) ABSTRACT

A method for manufacturing a part includes applying a first plurality of layers of material to a surface, inserting a mount onto the surface, applying a second plurality of layers of material onto the first plurality of layers and onto the mount, and removing the mount upon application of the second plurality of layers.

13 Claims, 5 Drawing Sheets

THREE-DIMENSIONAL PRINTING ASSEMBLY

FIELD

The present disclosure relates to three-dimensional (3D) printing, or additive manufacturing, and more specifically to support structures to assist in manufacturing 3D printed parts.

BACKGROUND

The statements in this section merely provide background information related to the present disclosure and may not constitute prior art.

Three-dimensional printing is increasingly being used to manufacture parts for motor vehicles. Various methods for 3D printing are used, including vat photopolymer processes, fused filament fabrication, and selective laser sintering. Generally, some of these 3D printing systems apply material onto a surface, incrementally adding layers of material as each previous layer hardens or cures into a new surface. Such systems are useful for manufacturing parts that are solid throughout a vertical direction, i.e., parts that do not have internal gaps, overlapping surfaces, or other voids where layers of material could not be incrementally placed.

For some 3D printing systems, support structures are used to support a part during the build process. After the part is 3D printed, the support structures are subsequently removed and discarded. When a part includes complex geometries, the configuration and placement of support structures can be challenging. Further, support structures by their nature involve material waste and generally increase the cost of 3D printing processes.

The present disclosure addresses these challenges with support structures used in 3D printing processes.

SUMMARY

This section provides a general summary of the disclosure and is not a comprehensive disclosure of its full scope or all of its features.

In one form, a method for manufacturing a part includes applying a first plurality of layers of material to a surface, securing a mount to the surface, applying a second plurality of layers of material onto the first plurality of layers and onto the mount, and removing the mount upon application of the second plurality of layers.

In variations of this method, which may be implemented individually or in any combination: the method further includes applying the first plurality of layers and the second plurality of layers in a vat photopolymer printing process; moving the surface vertically downward into a liquid polymer to apply the first plurality of layers and the second plurality of layers; applying the second plurality of layers onto the mount to form the flange; actuating a light source to cure the first and second pluralities of layers into the part; pausing application of the material and securing the mount to the surface while the application is paused; applying a plurality of filaments and sintering the filaments to form each layer of the first plurality of layers in a laser sintering process; applying a second plurality of filaments onto the mount and sintering the second filaments to form each layer of the second plurality of layers; depositing a liquid material and hardening the liquid material to form each layer of the first plurality of layers; the part includes a flange extending over a lower surface of the part; the first plurality of layers form the lower surface and the second plurality of layers form the flange; an outer surface of the mount is substantially flush with an outermost layer of the first plurality of layers; the first plurality of layers define a cavity exposing a portion of the surface, and the mount is secured to the portion of the surface within the cavity; the mount defines a gap between the first plurality of layers and the second plurality of layers.

In another form, a system for additively manufacturing a part includes a platform movable in a vertical direction, a reservoir disposed below the platform, the reservoir including a liquid polymer, and a reusable mount removably secured to the platform and configured to be disposed in a cavity of the part, wherein the platform is movable into the reservoir to apply the liquid polymer to a surface of the platform and to the mount secured to the platform, the liquid polymer forming layers of the part.

In variations of this system, which may be implemented individually or in any combination: a light source is configured to emit light to cure the liquid polymer; a controller is configured to actuate the light source to cure a second layer onto the first layer; a fastener removably secures the mount to the platform; the mount is movable by the platform into the reservoir to apply a second plurality of layers of the liquid polymer; a controller is configured to pause the platform upon application of a plurality of layers, to secure the mount to the platform above at least a portion of the plurality of layers, and to resume movement of the platform into the reservoir to apply a second plurality of layers of the liquid polymer onto the mount.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
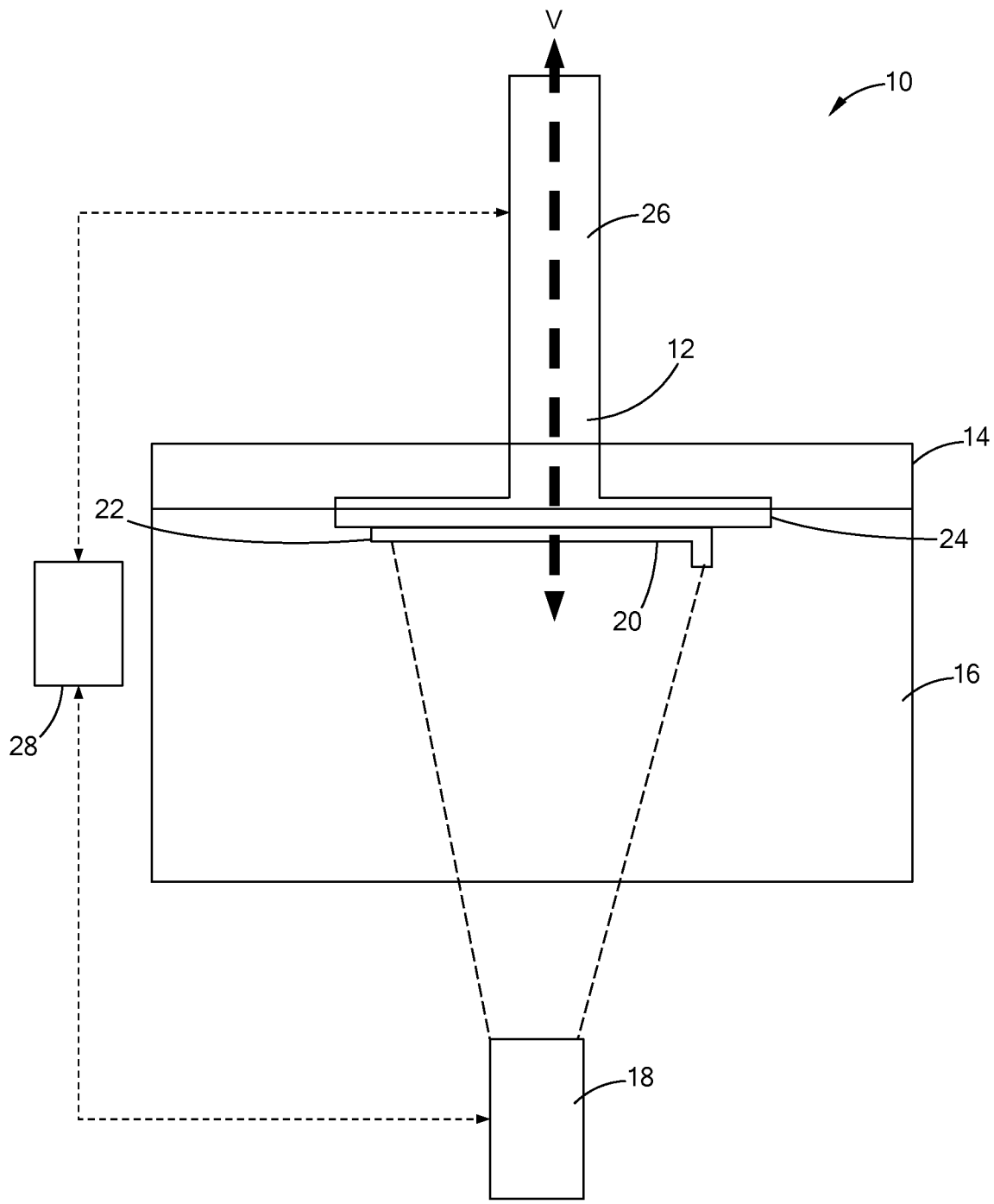
FIG. 1 is a side view of a three-dimensional additive printing system according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, an additive printing system 10 includes a movable platform 12, a reservoir 14 of liquid polymer 16, and a light source 18. The additive printing system 10 is a system for an additive manufacturing, or 3D printing process. In this context, "3D printing" is a process by which material is progressively deposited onto previous material in order to form a part.

In one form, the additive printing system 10 is a vat photopolymer (VPP) system. The VPP system 10 forms a part 20 by inserting the platform 12 into the reservoir 14 (referred to as a "vat" in VPP contexts) below the platform 12 and curing liquid polymer 16 in the reservoir 14 with light emitted from the light source 18 in a plurality of layers 22 onto a surface 24 of the platform 12. The platform 12 is then removed from the vat 14, and the solid part 20 is removed from the platform 12. VPP provides a way to print three-dimensional (3D) parts 20 that do not have overlapping surfaces, such as flanges or extensions, because the light emitted from the light source 18 cures polymer 16 on a surface (such as the cured layers 22 or the surface 24 of the platform 12) that the light reaches.

The platform 12 of the VPP system 10 is movable along a vertical direction V into and out of the reservoir 14. The VPP system 10 includes one or more movable components 26, such as a linear actuator or a robotic arm, that move the platform 12 into the reservoir 14, submerging at least a portion of the platform 12 in the liquid polymer 16. The light reaches the surface 24 of the platform 12 and cures the liquid polymer 16 adjacent to the platform 12, forming a solid layer 22 of polymer 16. Then, the light reaches the solid layer 22 and cures the liquid polymer 16 adjacent to the solid layer 22, forming a second solid layer 22 of polymer.

The light source 18 emits light to cure the polymer onto the platform, applying a layer of polymer to the platform. The light source 18 can emit visible light, ultraviolet light, and/or a laser. The light source 18 is disposed beneath the transparent reservoir, and the light from the light source 18 travels through the walls of the reservoir 14 and the liquid polymer 16 until reaching the surface of the platform 12 or a layer of cured polymer. The light source 18 includes one or more devices (not shown) to change a shape of emitted light based on the shape of the layer to be formed onto the platform 12 to form the part 20, for example, a movable screen that blocks at least a portion of light emitted from the light source 18.

In another form not shown in the figures, the additive printing process is fused filament fabrication (FFF). In FFF, filaments of semisolid material are deposited onto a surface 24 of a platform 12, and the filaments are then hardened into a solid layer 22 of material. Once the layer 22 of material is hardened, more filaments of semisolid material are deposited onto the solid layer 22 to harden into a second solid layer 22 of material. Filaments are deposited in successive layers 22 until the part 20 is completely formed. In yet another form not shown in the figures, the additive printing process is selective laser sintering, in which layers of powder are deposited onto a surface 24 and a laser sinters the powder into a solid layer 22. Additional powder is then deposited onto the solid layer 22 and sintered into another solid layer 22, and layers 22 are sintered incrementally until the part 20 is completed.

The additive printing system 10 includes a controller 28. The controller 28 is configured to actuate parts of the additive printing system 10 to additively print the part 20. In one form, the controller 28 is configured with one or more additive printing software programs that receive a graphical model of the part 20 and provide instructions to the light source 18 and the components 26 supporting the platform 12 to additively print the part 20 according to the received model. The controller 28 instructs one or more components 26, such as a linear actuator, to move the platform 12 into the reservoir 14 and instructs the light source 18 to emit light, curing the liquid polymer 16 onto the platform 12 into solid layers 22 to additively build the part 20. In another form not shown in the figures, the controller 28 is configured to receive instructions from an external server to perform an additive printing process to manufacture the part 20. In such a form, the controller 28 receives the instructions from the server via a network such as WiFi or Bluetooth®.

Figure 2:
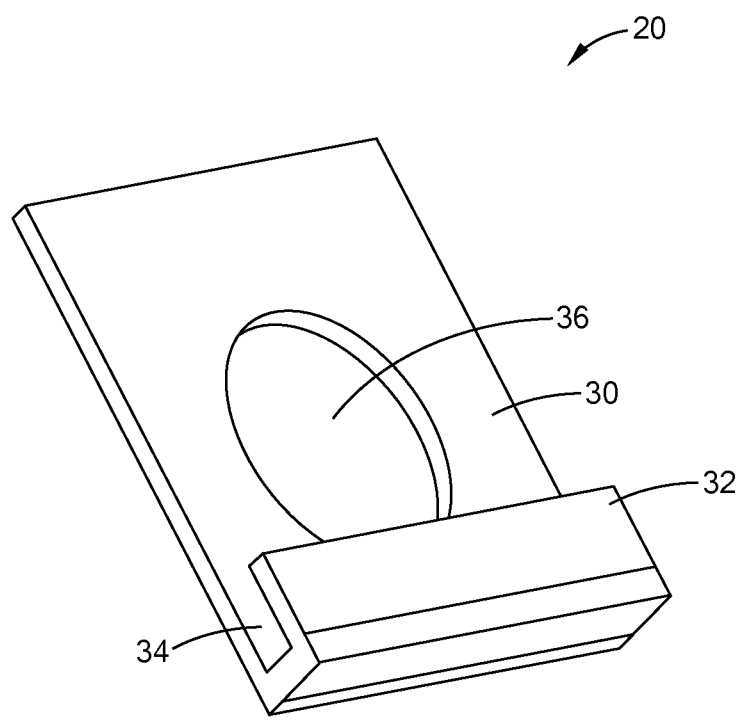
FIG. 2 is a perspective view of a part printed by the additive printing system of FIG. 1.

With reference to FIG. 2, the additive printing system 10 is configured to manufacture the part 20. The part 20 is in one form a portion of a component for a vehicle. The part 20 includes a lower surface 30 and a flange 32 extending over the lower surface 30. The flange 32 extends from the lower surface 30 to, e.g., receive another component. In one form, the flange 32 is L-shaped such that a gap 34 is defined between the flange 32 and the lower surface 30 of the part 20. In another form not shown in the figures, the flange 32 is straight. Additively printing the flange 32 may be difficult because the flange 32 is spaced from the lower surface 30, but the additive printing system 10 may not typically be able to apply layers 22 of material to form the gap 34. For example, in VPP, layers 22 of material are cured onto a surface 24 in the reservoir 14 of liquid polymer 16, and cannot form layers 22 spaced from that surface 24. In the form shown in FIG. 2, the part 20 includes a cavity 36 exposing the surface 24 of the platform 12. It should be understood that the specific geometry for the part 20 as illustrated and described herein is merely exemplary, and thus a number of different part geometries may be employed while remaining within the scope of the present disclosure.

Figure 3:
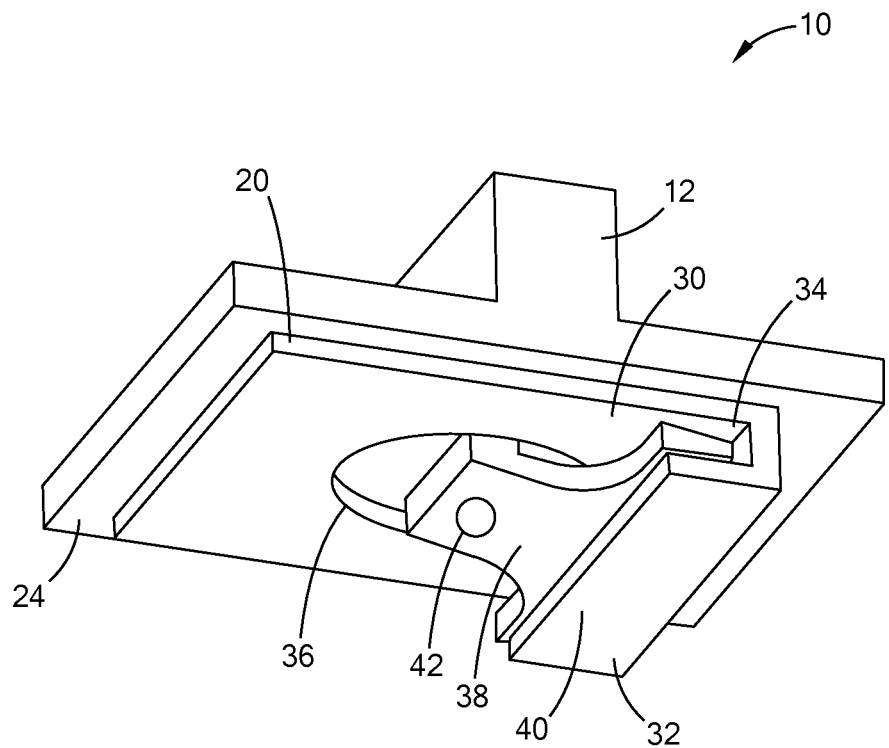
FIG. 3 is a perspective view of a mount attached to a platform of the additive printing system of FIG. 1.

With reference to FIG. 3, The additive printing system 10 includes a mount 38. The mount 38 provides a surface onto which the additive printing system 10 applies additional layers 40 of material to form a portion of the part 20. The mount 38 allows construction of parts 20 with flanges and other extensions that would otherwise be difficult to construct with an additive printing process such as VPP.

In the VPP system, the light emitted from the light source 18 cures liquid polymer 16 near the surface of the mount 38. Additional layers 40 formed on the mount 38 define the gap 34 with the lower surface 30 of the part 20. That is, in the form of FIG. 3, a first plurality of layers 22 form the lower surface 30 of the part 20, and a second plurality of layers 40 form the flange 32 and define the gap 34 between the lower surface 30 and the flange 32. The form of FIG. 3 illustrates a first plurality of layers 22 and a second plurality of layers 40, and it is understood that additional plurality of layers are within the scope of this disclosure.

The mount 38 is removably secured to the platform 12. In the form shown in FIG. 3, the mount 38 is secured to the surface 24 of the platform 12 exposed by the cavity 36 with a fastener 42, such as a screw or a bolt. The fastener 42 is removable to release the mount 38 from the platform 12.

In a different additive printing process, such as FFF, one or more layers are deposited onto the mount to form the flanges and/or extensions of the part. During the additive printing process, a first portion of the part 20 is formed on the platform 12 with a first plurality of layers 22, then the mount 38 is secured to the platform 12 with the fastener 42 and then the rest of the part is formed with a second plurality of layers 40 of material formed onto the mount 38. The mount 38 is then removed from the platform 12 upon completion of the part 20 and can be used to form another part 20, i.e., the mount is reusable. In one form, the mount 38 is a material that forms a low friction interference with the part 20 such that the mount 38 is removed without breaking or tearing material from the part 20. In another form, the mount 38 includes a film (not shown) separating the mount 38 from the part 20, the film being a material forming a low friction interference with the part 20 such that removal of the mount 38 does not break or tear material of the part 20.

The part 20 and mount 38 shown in FIG. 3 shows an L-shaped flange 32, and other shapes of flanges and parts are within the scope of this disclosure. In another form not shown in the figures, the part has a T-shape, and the mount provides the surface onto which layers of polymer cure to form the upper bar of the "T." Because the upper bar of the "T" is vertically above the platform, the mount provides a surface between the light source and the platform onto which layers of polymer cure into the upper bar.

Figure 4A:
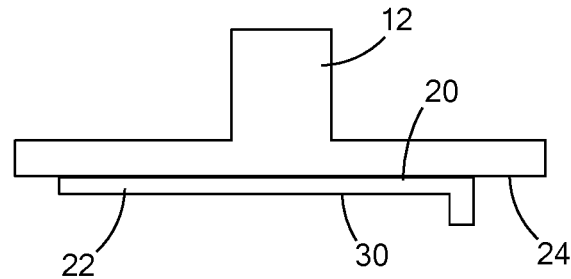
FIGS. 4A-4C illustrate forming the part with the mount secured to the platform according to the teachings of the present disclosure.
Figure 4B:
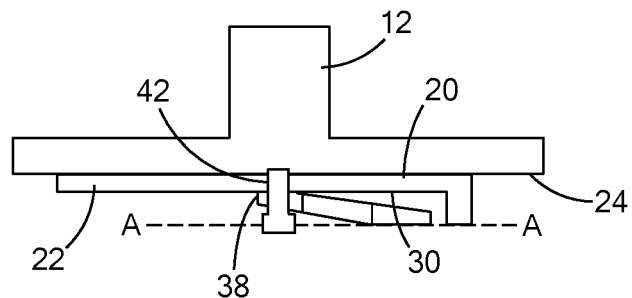
Figure 4C:
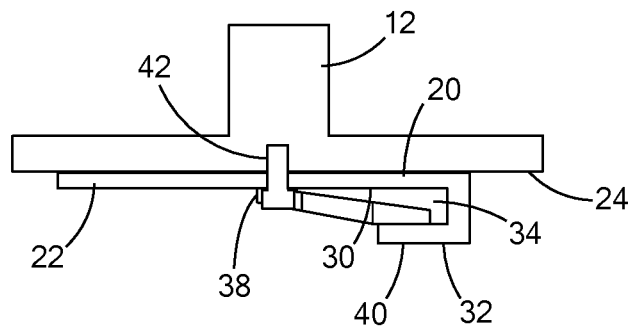

FIGS. 4A-4C illustrate additively manufacturing the part 20 with the mount 38 in a VPP process. FIG. 4A shows the lower surface 30 of the part 20 formed by VPP. As described above, the controller 28 actuates the light source 18 to cure a first plurality of layers 22 of polymer to form the lower surface 30 of the part 20. Each layer 22 of material is cured onto either the surface 24 of the platform 12 directly or onto another layer 22 of material. Because there is sufficient material, either in the form of the platform 24, or prior cured material, for newly cured resin to adhere to, no mount 38 is needed to form the portion of the part 20 shown in FIG. 4A.

Then, in FIG. 4B, the controller 28 pauses the VPP process, removes the platform 12 from the reservoir 14, and the mount 38 is secured to the platform 12 with the fastener 42. As described above, the mount 38 is secured to the platform 12 to present a surface onto which polymer 16 is cured. The mount 38 is positioned such that an outermost surface of the mount 38 is substantially flush with an outermost layer of the first plurality of layers 22, shown with the dashed line A-A in FIG. 4B. When the mount 38 is substantially flush with the first plurality of layers 22, subsequent layers of material formed on the mount 38 extend onto the layers 22 in a continuous manner.

Then, in FIG. 4C, the controller 28 continues the VPP process, curing a second plurality of layers 40 of polymer 16 onto the mount 38 to form the flange 32. Because the mount 38 blocks light from the light source 18 from reaching the lower surface 30, the mount 38 forms the gap 34 between the flange 32 and the lower surface 30. Once the second plurality of layer 40 is applied, the part 20 is completed. Upon completion of the part 20, the controller 28 ends the VPP process, the platform 12 is removed from the reservoir 14, the mount 38 is removed from the platform 12, and the completed part 20 is removed from the surface 24.

In another form not shown in the figures, another additive printing process such as FFF manufactures the part 20. In such a process, filaments are deposited onto the surface 24 of the platform 12 to form layers 22 of material. Then, the mount 38 is secured to the surface 24 of the platform 12 with the fastener 42. When additional layers 40 of material are deposited onto the mount 38, the gap 34 forms between the lower surface 30 of the part 20 and the flange 32 formed on the mount 38. Then, the fastener 42 is removed, the mount 38 is released from the surface 24 of the platform 12, and the part 20 is completed.

Figure 5:
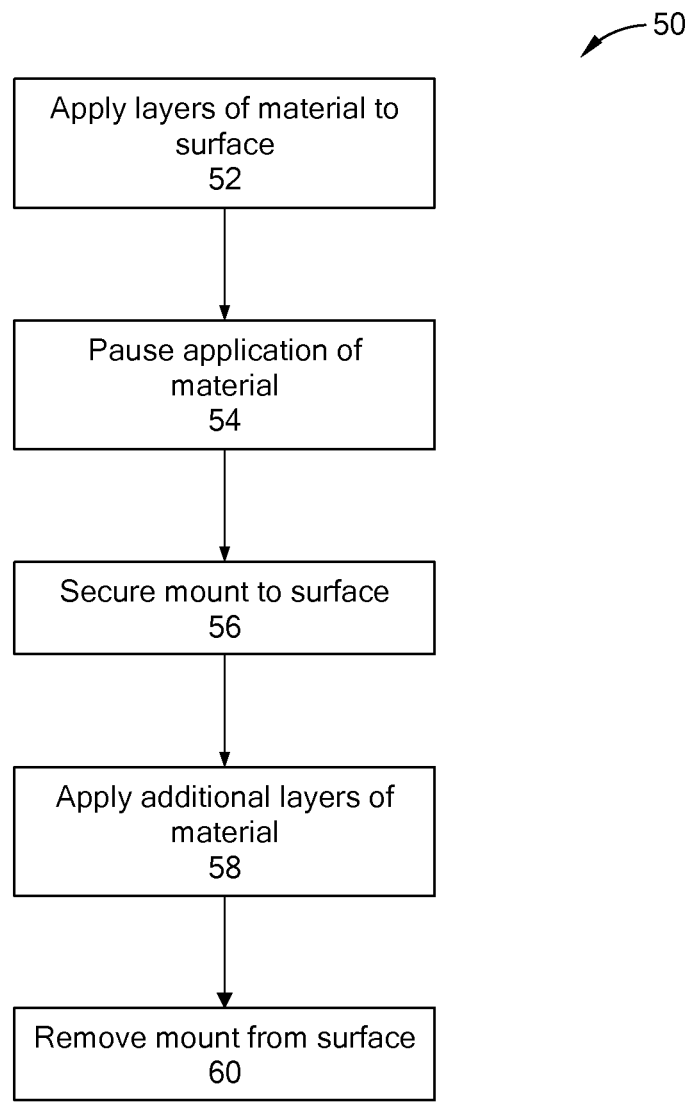
FIG. 5 is a block diagram of a process for manufacturing the part with the additive printing system according to the teachings of the present disclosure.

FIG. 5 is a block diagram of an example process 50 for additively manufacturing a part 20. The process 50 begins in a block 52, in which a controller 28 actuates one or more components 26 of an additive printing system 10 to apply a first plurality of layers 22 of material to a surface 24 of a platform 12. As described above, the first plurality of layers 22 are, in a VPP process, layers of polymer cured by light emitted from a light source 18 onto the surface 24 submerged in a reservoir 14 of liquid polymer 16. In another form, the first plurality of layers 22 are, in a FFF process, layers of hardened filaments deposited onto the surface 24 of the platform 12.

Next, in a block 54, the controller 28 pauses application of material onto the surface 24. As described above, the controller 28 ceases to apply material to the surface 24 of the platform 12, stopping manufacturing of the part 20. In the VPP process, the controller 28 deactivates the light source 18 and actuates a component 26 (such as a linear actuator) to remove the platform 12 from the reservoir 14.

Next, in a block 56, a mount 38 is secured to the surface 24 of the platform 12. As described above, the mount 38 provides a location onto which additional layers of material are deposited to form portions of the part 20 that have overlapping surfaces with another portion of the part 20, such as a flange 32 that defines a gap 34 with a lower surface 30 of the part 20. The mount 38 is secured to the surface 24 with a fastener 42 such as a screw or a bolt.

Next, in a block 58, the controller 28 applies additional layers of material to the mount 38 to form a second plurality of layers 40. In the VPP process, the controller 28 actuates the components 26 to move the platform 12 into the reservoir 14 and actuates the light source 18 to cure liquid polymer 16 onto the surface of the mount 38 into a solid layer of polymer. In the FFF process, filaments of material are deposited onto the mount 38 to harden into a layer.

Next, in a block 60, upon completion of the part 20, the mount 38 is removed from the surface 24 of the platform 12. Upon application of the second plurality of layers 40 forming the flange 32, the part 20 is completed, and the controller 28 actuates the components 26 to remove the platform 12 from the reservoir 14. In one form, the mount 38 is removed with the completed part 20. In another form, the completed part 20 is removed from the platform 12, and then the mount 38 is removed separately from the platform 12. The mount 38 is reusable and prepared for use to form another part 20. Following the block 60, the process 50 ends.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing a part, the method comprising:
    applying a first plurality of layers of material to a surface of a platform;
    securing a mount directly to the platform with a fastener, the mount having a first end secured to the platform and a second end extending away from the surface of the platform;
    applying a second plurality of layers of material onto the first plurality of layers and onto an outer surface of the second end of the mount; and
    removing the mount upon after application of the second plurality of layers, the first plurality of layers and the second plurality of layers defining a gap therebetween and being connected by a wall extending from the first plurality of layers to the second plurality of layers.

2. The method of claim 1, further comprising applying the first plurality of layers and the second plurality of layers in a vat photopolymer printing process.

3. The method of claim 1, further comprising moving the platform vertically downward into a liquid polymer to apply the first plurality of layers and the second plurality of layers.

4. The method of claim 1, wherein the part includes a flange extending over a lower surface of the part.

5. The method of claim 4, wherein the first plurality of layers form the lower surface and the second plurality of layers form the flange.

6. The method of claim 5, further comprising applying the second plurality of layers onto the mount to form the flange.

7. The method of claim 1, further comprising actuating a light source to cure the first and second pluralities of layers into the part.

8. The method of claim 1, further comprising pausing application of the material and securing the mount to the platform while the application is paused.

9. The method of claim 1, wherein an outer surface of the mount is substantially flush with an outermost layer of the first plurality of layers.

10. The method of claim 1, wherein the first plurality of layers define a cavity exposing a portion of the surface of the platform, and the mount is secured to the portion of the surface of the platform within the cavity.

11. The method of claim 1, further comprising applying a plurality of filaments and sintering the filaments to form each layer of the first plurality of layers in a laser sintering process.

12. The method of claim 11, further comprising applying a second plurality of filaments onto the mount and sintering the second filaments to form each layer of the second plurality of layers.

13. The method of claim 1, further comprising depositing a liquid material and hardening the liquid material to form each layer of the first plurality of layers.

* * * * *